United States Patent
Shimizu

(10) Patent No.: US 6,236,522 B1
(45) Date of Patent: May 22, 2001

(54) PHOTOGRAPHIC OPTICAL SYSTEM

(75) Inventor: Seiji Shimizu, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/203,271

(22) Filed: Dec. 1, 1998

(30) Foreign Application Priority Data

Dec. 2, 1997 (JP) .................................................. 9-331603

(51) Int. Cl.[7] .............................. G02B 9/34; G02B 15/14
(52) U.S. Cl. ........................... 359/773; 359/689; 359/686
(58) Field of Search .................................. 359/686, 689, 359/683, 780, 782, 791, 773

(56) References Cited

U.S. PATENT DOCUMENTS

| | | | |
|---|---|---|---|
| 4,757,336 | * | 7/1988 | Nakayama et al. .................. 359/689 |
| 4,952,038 | * | 8/1990 | Ito .......................................... 359/689 |
| 5,087,988 | | 2/1992 | Nakayama ............................ 359/689 |
| 5,305,148 | | 4/1994 | Ikemori et al. ....................... 359/689 |
| 5,325,235 | * | 6/1994 | Takashima et al. .................. 359/689 |
| 5,485,313 | * | 1/1996 | Betensky .............................. 359/689 |
| 5,808,808 | * | 9/1998 | Yamanashi ........................... 359/689 |

FOREIGN PATENT DOCUMENTS 8-160298   6/1996   (JP) .

* cited by examiner

Primary Examiner—Scott J. Sugarman
(74) Attorney, Agent, or Firm—Pillsbury Winthrop LLP

(57) ABSTRACT

A photographic optical system greatly improved in chromatic aberration and capable of providing high image quality with a compact, lightweight and low-cost arrangement having a minimal number of constituent elements. The optical system has a negative lens placed closest to the image side thereof, and a positive lens, a negative lens and a positive lens, which are placed in order from the object side of the optical system on the object side of the negative lens closest to the image side. The negative lens closest to the image side satisfies the following conditions: $75.0 \leq v_d$ and $0.8 \leq SG \leq 2.2$, where $v_d$ and SG are the Abbe's number and lens specific gravity (g/cm$^3$) of the negative lens closest to the image side.

13 Claims, 7 Drawing Sheets

(Wide-angle end)

(Wide-angle end)

(Wide-angle end)

(Middle focal length position)

(Telephoto end)

(Wide-angle end)

(Middle focal length position)

(Telephoto end)

(Wide-angle end)

(Middle focal length position)

(Telephoto end)

PHOTOGRAPHIC OPTICAL SYSTEM

BACKGROUND OF THE INVENTION

The present invention relates to a photographic optical system and, more particularly, to a photographic optical system used in a camera for photography.

Photographic optical systems used in cameras for photography in recent years, particularly zoom optical systems are demanded to provide a high zoom ratio and to be compact in size. As the zoom ratio becomes higher, it becomes likelier that variations in aberrations, particularly variations in chromatic aberration, will limit the improvement in performance by aberration correction. Attempts have heretofore been made to improve chromatic aberration, for example, by using ED lenses.

ED lenses are low-refractive index and low-dispersive glass and have anomalous partial dispersion. Therefore, they allow removal of the secondary spectrum, which has heretofore been impossible to remove by the conventional optical glass alone.

Many examples are known as the prior art that uses ED lenses, including Japanese Patent Application Unexamined Publication (KOKAI) Nos. 8-160298, 4-95912, 3-260611 and 3-158816.

The above-mentioned prior art attains a compact zoom optical system by effectively using ED lenses in a lens arrangement comprising a minimal number of lens elements. Furthermore, the final lens unit is formed from a single negative lens having a concave surface directed toward the object side, thereby allowing the lens unit to come closer to the forward end of the lens system when it is collapsed. Accordingly, the arrangement is also favorable for achieving a reduction in the size of the optical system.

However, all these conventional zoom optical systems have a zoom ratio of 2 or less. Accordingly, the specifications of these zoom optical systems cannot be said to be attractive to users who demand zoom optical systems of high zoom ratio in recent years. Meanwhile, zoom optical systems designed to attain a high zoom ratio have an unfavorably large number of constituent lens elements, which is contrary to the purpose of attaining a compact optical system and likely to cause the cost to rise.

ED lenses are soft and readily scratchable in comparison to ordinary optical glasses and have a relatively large specific gravity (3.5 g/cm³ or more). Therefore, when ED lenses are used, it is necessary to consider that if a large number of ED lenses are used, the cost rises, and the optical system becomes heavy.

SUMMARY OF THE INVENTION

In view of the above-described problems with the prior art, an object of the present invention is to provide a photographic optical system which is greatly improved in chromatic aberration and capable of providing high image quality with a compact, lightweight and low-cost arrangement having a minimal number of constituent elements.

Another object of the present invention is to provide a photographic lens system arranged as a zoom optical system, in particular, which is designed so that variations in chromatic aberration due to zooming are minimized and the focal length at the telephoto end, in particular, is increased to a considerable extent despite a lens arrangement which is similar to the conventional lens arrangement and has the number of constituent lens elements that is similar to that of the conventional lens arrangement.

A first photographic optical system according to the present invention, which is provided to attain the above-described objects, has a negative lens placed closest to the image side of the photographic optical system, and a positive lens, a negative lens and a positive lens, which are placed in order from the object side of the photographic optical system on the object side of the negative lens closest to the image side. The negative lens closest to the image side satisfies the following conditions:

$$75.0 \leq \nu_d \quad (1)$$

$$0.8 \leq SG \leq 2.2 \quad (2)$$

where $\nu_d$ and SG are the Abbe's number and lens specific gravity (g/cm³) of the negative lens closest to the image side.

A second photographic optical system according to the present invention is a zoom optical system including a single lens of negative refracting power that is placed closest to the image side of the optical system. The single lens of negative refracting power satisfies the following conditions:

$$75.0 \leq \nu_d \quad (3)$$

$$0.8 \leq SG \leq 2.2 \quad (4)$$

where $\nu_d$ and SG are the Abbe's number and lens specific gravity (g/cm³) of the single lens of negative refracting power that is closest to the image side.

A third photographic optical system according to the present invention is a zoom optical system including at least a negative lens unit placed closest to the image side of the optical system, and two positive lens units placed on the object side of the negative lens unit closest to the image side. The negative lens unit is formed from a single lens. The single lens satisfies the following condition:

$$75.0 \leq \nu_d \quad (5)$$

where $\nu_d$ is the Abbe's number of the single lens that forms the negative lens unit.

A fourth photographic optical system according to the present invention includes a single lens of negative refracting power that is placed closest to the image side of the optical system. The single lens of negative refracting power that is closest to the image side satisfies the following condition:

$$n_d \leq 1.40 \quad (6)$$

where $n_d$ is the refractive index of the single lens of negative refracting power that is closest to the image side.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
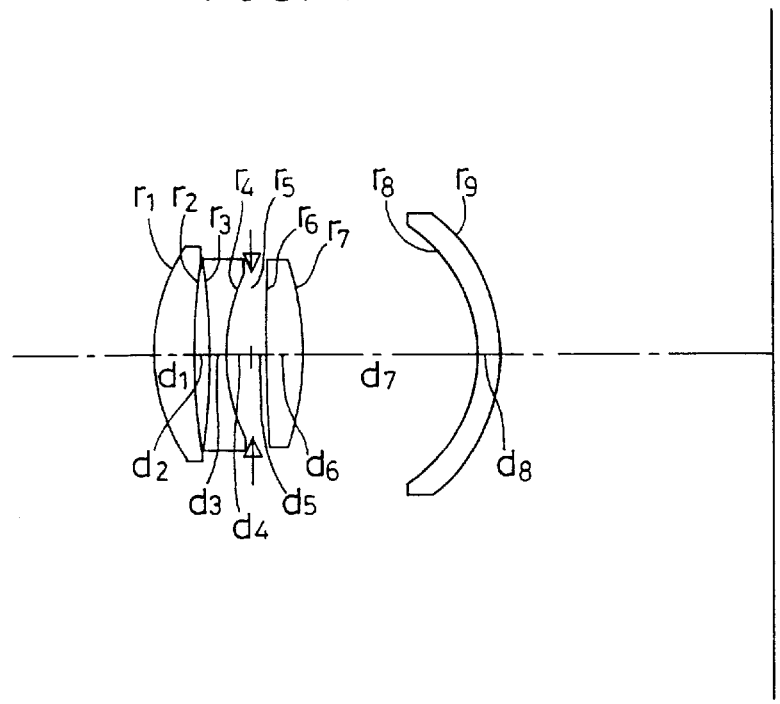
FIG. 1 is a sectional view of a photographic optical system according to Example 1 of the present invention.

The reasons for adopting the above-described arrangements in the present invention, together with the functions thereof, will be described below.

The first photographic optical system according to the present invention has a negative lens placed closest to the image side of the photographic optical system, and a positive lens, a negative lens and a positive lens, which are placed in order from the object side of the photographic optical system on the object side of the negative lens closest to the image side. The negative lens closest to the image side satisfies the following conditions:

$$75.0 \leq v_d \tag{1}$$

$$0.8 \leq SG \leq 2.2 \tag{2}$$

where $v_d$ and SG are the Abbe's number and lens specific gravity (g/cm$^3$) of the negative lens closest to the image side.

There have heretofore been proposed many telephoto type optical systems in which a negative lens having a convex surface directed toward the image side is placed behind a triplet lens as in the photographic optical system according to the present invention.

According to the present invention, a lens having a small specific gravity is placed as the negative lens closest to the image side. Ordinary optical glass lenses have a specific gravity SG (g/cm$^3$) of 2.25 or more. In the present invention, a lens of SG≦2.2, e.g. a lens made of an optical plastic material, is used to thereby achieve a lightweight and low-cost optical system. Moreover, the use of an optical plastic material enables an aspherical surface to be produced easily and allows the performance to be improved even more effectively. In other words, aberrations, particularly curvature of field and coma, are effectively corrected by using an aspherical lens as the final lens where the central and marginal rays are most separate from each other.

The object of the present invention is to satisfactorily correct aberration that cannot be corrected even by using an aspherical surface, that is, chromatic aberration. An ideal method of correcting chromatic aberration is to correct it in each lens unit. In the case of an optical system such as that of the present invention, the triplet lens as a front unit and the negative lens as a rear unit should be each corrected for chromatic aberration.

In general, achromatization is effected by combining together a plurality of lenses of different dispersion. The above-described rear unit is formed from a single negative lens. Therefore, it is necessary for the single negative lens itself to be a lens of small dispersion. The triplet lens, which forms the front unit, can be satisfactorily corrected for chromatic aberration by a combination of two positive lenses and one negative lens.

Accordingly, it is possible to provide a photographic optical system having minimal chromatic aberration by placing a lens of ultra-low dispersion, i.e. 75.0≦$v_d$, as the negative lens closest to the image side.

Furthermore, it is preferable to satisfy the following condition (7):

$$n_d \leq 1.40 \tag{7}$$

where $n_d$ is the refractive index of the negative lens closest to the image side.

The negative lens closest to the image side is located closest to the film plane. Therefore, there is likelihood that reflected light from the film plane will be reflected by the negative lens to enter the image field as flare, causing the image quality to be degraded. The reflectance R is calculated by $R=[(n-n')/(n+n')]^2$ (n and n' are the refractive indices in front of and behind an interface). For example, in the case of a vitreous material of refractive index $n_d$=1.6, R=5.3%, whereas in the case of a vitreous material of refractive index $n_d$=1.4, R=2.8%, which is about half the refractive index of the former.

It is also preferable to satisfy the following condition (8):

$$3 \leq |f_1/f| \leq 10 \tag{8}$$

where f is the focal length of the entire optical system, and $f_1$ is the focal length of the negative lens closest to the image side.

If $|f_1/f|$ is smaller than the lower limit of the condition (8), i.e. 3, the power of the negative lens becomes excessively strong. Consequently, the curvature of the lens becomes very strong, resulting in a lens shape difficult to process. Accordingly, the lens becomes difficult to produce, and the effect (sensitivity) on the performance is remarkable. Therefore, it becomes difficult to carry out mass-production. Moreover, a focal shift and other effects produced by changes in temperature and humidity become remarkable. Accordingly, it is undesirable to set $|f_1/f|$ smaller than the lower limit of the condition (8), i.e. 3. If $|f_1/f|$ is larger than the upper limit of the condition (8), i.e. 10, the power of the negative lens becomes excessively weak, so that the effect of correcting various aberrations is lost.

For the negative lens closest to the image side, for example, an optical plastic material known as "CYTOP" (trade name) can be used. This plastic material is low in hygroscopicity and hence capable of minimizing a focal shift and other effects produced by changes in humidity.

The second photographic optical system according to the present invention is a zoom optical system including a single lens of negative refracting power that is placed closest to the image side of the optical system. The single lens of negative refracting power satisfies the following conditions:

$$75.0 \leq v_d \tag{3}$$

$$0.8 \leq SG \leq 2.2 \tag{4}$$

where $v_d$ and SG are the Abbe's number and lens specific gravity (g/cm$^3$) of the single lens of negative refracting power that is closest to the image side.

A zoom optical system in which a lens unit placed closest to the image side, that is, the final lens unit, has a negative refracting power as in the present invention is generally arranged in the form of a two-unit zoom lens system having a positive lens unit and a negative lens unit, or a three-unit zoom lens system having a positive lens unit, a positive lens unit and a negative lens unit, or a four-unit zoom lens system having a positive or negative lens unit, a positive lens unit, a positive lens unit and a negative lens unit. In many of such zoom optical systems, the final lens unit has the largest aperture. In the present invention, a lens of small specific gravity is used to form the final lens unit. As has been stated above, ordinary optical glass lenses have a specific gravity of 2.25 or more. The use of a lens of SG≦2.2, e.g. a lens made of an optical plastic material, as in the present invention makes it possible to achieve a lightweight and low-cost lens system. Moreover, the use of an optical plastic material enables an aspherical surface to be produced easily and allows the performance to be improved even more effectively, and it is particularly effective for improving the marginal performance at the wide-angle end.

However, chromatic aberration cannot satisfactorily be corrected even by using an aspherical surface. In the case of a zoom optical system in particular, an ideal method of correcting chromatic aberration is to correct it in each lens unit.

In a zoom optical system in which the final lens unit is formed from a single negative lens as in the present invention, it is necessary for the single negative lens itself to be a lens of small dispersion. Therefore, the second photographic optical system according to the present invention adopts an arrangement in which a lens of ultra-low dispersion, i.e. $75.0 \leq v_d$, and small specific gravity, e.g. an optical plastic lens, is placed in the final negative lens unit. The provision of a lens of ultra-low dispersion in the final negative lens unit (zoom lens unit) makes it possible to minimize variations in chromatic aberration during zooming and particularly makes it possible to correct lateral chromatic aberration at the wide-angle end and axial chromatic aberration at the telephoto end with good balance. Furthermore, because the number of lenses used for achromatization is smaller than in the conventional practice, the cost can be minimized, and the optical system can be made light in weight.

It is also preferable for the final lens unit to have a configuration in which a concave surface is directed toward the object side. With this configuration, the entrance surface of the final negative lens unit is a deep concave surface. Consequently, when the lens system is collapsed, a lens unit in front of the final negative lens unit can go into the concave surface of the final negative lens unit. Accordingly, it is possible to shorten the structural length of the lens mount when collapsed.

Furthermore, it is preferable to satisfy the following condition (9):

$$n_d \leq 1.40 \tag{9}$$

where $n_d$ is the refractive index of the single lens of negative refracting power that is closest to the image side.

The single lens of negative refracting power that is closest to the image side is located closest to the film plane. Therefore, there is likelihood that reflected light from the film plane will be reflected by the final negative lens to enter the image field as flare, causing the image quality to be degraded. The reflectance R is calculated by $R=[(n-n')/(n+n')]^2$ (n and n' are the refractive indices in front of and behind an interface). For example, in the case of a vitreous material of refractive index $n_d=1.6$, R=5.3%, whereas in the case of a vitreous material of refractive index $n_d=1.4$, R=2.8%, which is about half the refractive index of the former.

It is also preferable to satisfy the following condition (10):

$$1.75 \leq \beta_{LT}/\beta_{LW} \tag{10}$$

where $\beta_{LT}$ is the lateral magnification at the telephoto end of the final negative lens unit of the zoom optical system, and $\beta_{LW}$ is the lateral magnification at the wide-angle end of the final negative lens unit of the zoom optical system.

It should be noted that if the final negative lens unit is a single negative lens, $\beta_{LT}$ is the lateral magnification at the telephoto end of the single lens of negative refracting power that is closest to the image side of the zoom optical system, and $\beta_{LW}$ is the lateral magnification at the wide-angle end of the single lens of negative refracting power that is closest to the image side of the zoom optical system.

The condition (10) is a condition for attaining a high zoom ratio. If $\beta_{LT}/\beta_{LW}$ is smaller than the lower limit, i.e. 1.75, the load of zooming shifts from the final negative lens unit to a lens unit located in front of the final negative lens unit, resulting in an increase in the amount of movement of each lens unit during zooming. Consequently, it becomes impossible to attain a reduction in the size of the optical system. In addition, as the zoom ratio decreases, variations in chromatic aberration also decrease. Accordingly, the effect produced by using a lens of $75.0 \leq v_d$ weakens.

It is preferable that a lens unit that is located immediately in front of the final lens unit should be formed from two lenses, i.e. a negative lens and a positive lens in order from the object side, and the positive lens should be a lens that satisfies the conditions of $75.0 \leq v_p$ and $0.8 \leq SG \leq 2.2$, where $v_p$ and SG are the Abbe's number and lens specific gravity of the positive lens.

In a zoom optical system arranged in the form of a two-unit zoom lens system having a positive lens unit and a negative lens unit, or a three-unit zoom lens system having a positive lens unit, a positive lens unit and a negative lens unit, or a four-unit zoom lens system having a positive or negative lens unit, a positive lens unit, a positive lens unit and a negative lens unit, as stated above, focusing on a close-distance object is generally effected by moving a lens unit located in front of the final negative lens unit. The reason for this is that the lens unit that is moved is small and the amount of lens movement can be minimized. Accordingly, if a lens of small specific gravity, e.g. an optical plastic lens, is provided in this lens unit, the weight of the lens unit is reduced, and thus the load imposed on a mechanical drive system during focusing or other operation is reduced.

Moreover, the use of an optical plastic material enables an aspherical surface to be produced easily and allows the performance to be improved even more effectively. It is particularly effective for correction of distortion at the wide-angle end and spherical aberration at the telephoto end. If an optical plastic material is used to form a positive lens, it becomes possible to cancel a focal shift and other effects produced by changes in temperature and humidity in combination with the above-described final negative lens.

Furthermore, it is preferable to satisfy the following condition (11):

$$n_d \leq 1.40 \tag{11}$$

where $n_d$ is the refractive index of the positive lens located immediately in front of the final negative lens unit.

It is preferable to satisfy the condition (11) simultaneously with the above-described condition (9). By making both the positive and negative lenses have a low refractive index, it becomes easy to ensure an appropriate value for the Petzval sum.

To correct chromatic aberration in the lens unit, a lens of relatively high dispersion is provided as the negative lens, whereas a lens of ultra-low dispersion is provided as the positive lens so that the condition (12) is satisfied. By doing so, chromatic aberration produced by the negative lens is corrected by the positive lens.

$$40 \leq v_p - v_n \tag{12}$$

where $v_p$ is the Abbe's number of the positive lens in the lens unit located immediately in front of the final negative lens unit, and $v_n$ is the Abbe's number of the negative lens in the lens unit immediately in front of the final negative lens unit.

It is also preferable to satisfy the following condition (13):

$$1.0 \leq |f_F/f_R| \leq 2.0 \tag{13}$$

where $f_R$ is the focal length of the final negative lens unit, and $f_F$ is the focal length of the lens unit located immediately in front of the final negative lens unit.

The condition (13) is a condition for appropriately setting the power of the final negative lens unit and the power of the lens unit immediately in front of it and for efficiently obtaining a predetermined zoom ratio. If $|f_F/f_R|$ exceeds the upper limit of the condition, i.e. 2.0, and hence the power of the final negative lens unit becomes excessively strong, it becomes difficult to correct off-axis aberrations, e.g. curvature of field. If $|f_F/f_R|$ is smaller than the lower limit of the condition, i.e. 1.0, and hence the power of the final negative lens unit becomes weak, the amount of movement of the final negative lens unit increases, resulting in an increase in the overall length of the lens system.

For the negative lens that forms the final negative lens unit, for example, an optical plastic material known as "CYTOP" (trade name) can be used. This plastic material is low in hygroscopicity and hence capable of minimizing a focal shift and other effects produced by changes in humidity.

Furthermore, it is preferable to form each lens unit from not more than two lenses.

It has already been known that when there are demands for a camera to be compact in size, the lens system is arranged to collapse when the user carries the camera with him or her, thereby making the camera compact in size. In this case, it is important to minimize the structural length of each lens unit.

The third photographic optical system according to the present invention is a zoom optical system having at least a negative lens unit placed closest to the image side of the optical system, and two positive lens units placed on the object side of the negative lens unit closest to the image side. The negative lens unit is formed from a single lens. The single lens satisfies the following condition:

$$75.0 \leq v_d \qquad (5)$$

where $v_d$ is the Abbe's number of the single lens that forms the negative lens unit.

A zoom optical system in which the final lens unit has a negative refracting power as in the present invention is generally arranged in the form of a three-unit zoom lens system having a positive lens unit, a positive lens unit and a negative lens unit, or a four-unit zoom lens system having a positive or negative lens unit, a positive lens unit, a positive lens unit and a negative lens unit.

In the case of a zoom optical system, an ideal method of correcting chromatic aberration is to correct it in each lens unit. In the case of a zoom optical system such as that in the present invention, the final negative lens unit is formed from a single negative lens. Therefore, it is impossible to effect achromatization by combining together a plurality of lenses of different dispersion. For this reason, it is necessary for the single negative lens itself to be a lens of small dispersion. Therefore, the third photographic optical system according to the present invention adopts an arrangement in which a lens of ultra-low dispersion, i.e. $75.0 \leq v_d$, is placed in the final negative lens unit. The provision of a lens of ultra-low dispersion in the final negative lens unit makes it possible to minimize variations in chromatic aberration during zooming and particularly makes it possible to correct lateral chromatic aberration at the wide-angle end and axial chromatic aberration at the telephoto end with good balance.

It is also preferable for the negative lens in the final lens unit to have a configuration in which a concave surface is directed toward the object side. With this configuration, the entrance surface of the final negative lens unit is a deep concave surface. Consequently, when the lens system is collapsed, a lens unit in front of the final negative lens-unit can go into the concave surface of the final negative lens unit. Accordingly, it is possible to shorten the structural length of the lens mount when collapsed.

If the negative lens in the final negative lens unit has an ultra-low refractive index, as stated above, it is possible to obtain a flare-preventing effect. If the negative lens has a relatively high refractive index, the radius of curvature of the lens can be increased, and it becomes easy to produce the lens. It also becomes possible to reduce the effect (sensitivity) on the performance. Accordingly, effects obtained by variously setting the refractive index of the negative lens should be balanced with each other for each particular lens system.

It is also preferable to satisfy the following condition (14):

$$1.75 \leq \beta_{LT}/\beta_{LW} \qquad (14)$$

where $\beta_{LT}$ is the lateral magnification at the telephoto end of the final negative lens unit of the zoom optical system, and $\beta_{LW}$ is the lateral magnification at the wide-angle end of the final negative lens unit.

The condition (14) is a condition for attaining a high zoom ratio. If $\beta_{LT}/\beta_{LW}$ is smaller than the lower limit, i.e. 1.75, the load of zooming shifts from the final negative lens unit to a positive lens unit (hereinafter referred to as "positive second lens unit") located closer to the final negative lens unit of the two positive lens units placed on the object side of the final negative lens unit, resulting in an increase in the amount of movement of each lens unit during zooming. Consequently, it becomes impossible to attain a reduction in the size of the optical system. In addition, as the zoom ratio decreases, variations in chromatic aberration also decrease. Accordingly, the effect produced by using a lens of $75.0 \leq v_d$ weakens.

Furthermore, it is preferable that the negative lens in the final negative lens unit should be an aspherical lens. The use of an aspherical lens allows the performance to be improved even more effectively. It is particularly effective for improving the marginal performance at the wide-angle end.

As has already been stated, the use of a glass lens such as an ED lens causes the cost to rise because it is soft and difficult to process. An aspherical lens dispenses with a polishing process in the production by molding. Accordingly, it is possible to attain a low-cost lens system by using an aspherical lens.

Furthermore, it is preferable that the positive second lens unit should be formed from two lenses, i.e. a negative lens and a positive lens in order from the object side, and the two lenses should satisfy the following conditions (15) and (16):

$$75.0 \leq v_P \qquad (15)$$

$$40 \leq v_P - v_N \qquad (16)$$

where $v_P$ is the Abbe's number of the positive lens in the positive second lens unit, and $v_N$ is the Abbe's number of the negative lens in the positive second lens unit.

To correct chromatic aberration in the lens unit, a lens of relatively high dispersion is provided as the negative lens, whereas a lens of ultra-low dispersion is provided as the positive lens so that the conditions (15) and (16) are satisfied. By doing so, chromatic aberration produced by the negative lens is corrected by the positive lens.

Furthermore, it is preferable that the positive lens in the positive second lens unit should be an aspherical lens. The use of an aspherical lens allows the performance to be improved even more effectively, and it is particularly effective for correction of distortion at the wide-angle end and spherical aberration at the telephoto end.

As has already been stated, the use of a glass lens such as an ED lens causes the cost to rise because it is soft and difficult to process. An aspherical lens dispenses with a polishing process in the production by molding. Accordingly, it is possible to attain a low-cost lens system by using an aspherical lens.

It is also preferable to satisfy the following condition (17):

$$1.0 \leq |f_2/f_1| \leq 2.0 \qquad (17)$$

where $f_1$ is the focal length of the final negative lens unit in the zoom optical system, and $f_2$ is the focal length of the positive second lens unit in the zoom optical system.

The condition (17) is a condition for appropriately setting the power of the final negative lens unit and the power of the positive second lens unit and for efficiently obtaining a predetermined zoom ratio. If $|f_2/f_{11}|$ exceeds the upper limit of the condition (17), i.e. 2.0, and hence the power of the final negative lens unit becomes excessively strong, it becomes difficult to correct off-axis aberrations, e.g. curvature of field. If $|f_2/f_1|$ is smaller than the lower limit, i.e. 1.0, and hence the power of the final negative lens unit becomes weak, the amount of movement of the final negative lens unit increases, resulting in an increase in the overall length of the lens system.

If the positive lens in the positive second lens unit has a high refractive index $n_d$, the radius of curvature of the lens can be increased, and it becomes easy to produce the lens. Therefore, it is preferable that the positive lens should have a high refractive index $n_d$.

The negative lens in the final negative lens unit and the positive lens in the positive second lens unit may be optical plastic lenses.

In a zoom optical system as in the present invention, i.e. a three-unit zoom lens system having a positive lens unit, a positive lens unit and a negative lens unit, or a four-unit zoom lens system having a positive or negative lens unit, a positive lens unit, a positive lens unit and a negative lens unit, the final negative lens unit has the largest aperture in general. Therefore, the use of an optical plastic lens as a lens in the final negative lens unit makes it possible to attain a lightweight and low-cost optical system.

Similarly, in many of zoom optical systems such as that in the present invention, focusing on a close-distance object is effected by moving the positive second lens unit. Accordingly, if the weight of the positive second lens unit is made as light as possible, the load on the mechanical drive system is reduced.

For the negative lens in the final negative lens unit and the positive lens in the positive second lens unit, for example, an optical plastic material known as "CYTOP" (trade name) can be used. This plastic material is low in hygroscopicity and hence capable of minimizing a focal shift and other effects produced by changes in humidity.

Furthermore, it is preferable to form each lens unit from not more than two lenses.

It has already been known that when there are demands for a camera to be compact in size, the lens system is arranged to collapse when the user carries the camera with him or her, thereby making the camera compact in size. In this case, it is important to minimize the structural length ($\Sigma d$) of each lens unit.

The fourth photographic optical system according to the present invention includes a single lens of negative refracting power that is placed closest to the image side of the optical system. The single lens of negative refracting power that is closest to the image side satisfies the following condition:

$$n_d \leq 1.40 \quad (6)$$

where $n_d$ is the refractive index of the single lens of negative refracting power that is closest to the image side.

A lens of low refractive index $n_d \leq 1.40$ is placed as the final lens located closest to the film. By doing so, it becomes possible to prevent reflected light from the film plane from being reflected by the final lens to enter the image field as flare, causing the image quality to be degraded.

The reflectance R is calculated by $R=[(n-n')/(n+n')]^2$ (n and n' are the refractive indices in front of and behind an interface). For example, in the case of a vitreous material of refractive index $n_d=1.6$, R=5.3%, whereas in the case of a vitreous material of refractive index $n_d=1.4$, R=2.8%, which is about half the refractive index of the former. If the need for an antireflection coating can be eliminated by doing so, the cost can be reduced.

Next, Examples 1 to 9 of the photographic optical system according to the present invention will be described.

In the case of zoom optical systems, particularly in the case of zoom optical systems in recent years that are demanded to increase the zoom ratio by increasing the focal length at the telephoto end, variations in aberrations, particularly variations in chromatic aberration, often limit the improvement in performance of the zoom optical systems by aberration correction. In the conventional zoom optical systems, there are large variations in axial chromatic aberration in zooming from the wide-angle end toward the telephoto end.

In the following examples of the zoom optical system according to the present invention, a lens of ultra-low dispersion, i.e. $75.0 \leq v_d$, is used to thereby enable chromatic aberration to be improved to a considerable extent. The use of such a lens makes it possible to attain higher performance than in the conventional zoom optical systems when the zoom ratio is the same. Alternatively, it is possible to attain an increase in the focal length at the telephoto end (i.e. a high zoom ratio). Accordingly, higher performance can be obtained with an optical system similar to the conventional optical systems and with the number of constituent lens elements that is similar to that in the prior art.

Examples of the present invention will be described below. It should be noted that numerical data in each example will be shown later.

EXAMPLE 1

This example is a fixed focal length lens system having four lens units formed from four lenses. As shown in the sectional view of FIG. 1, the lens system has, in order from the object side thereof, a positive meniscus lens that is convex toward the object side, a biconcave negative lens, a stop, a biconvex positive lens, and a negative meniscus lens that is concave toward the object side. The final negative lens is formed by using a plastic material "CYTOP". The final negative lens has an aspherical surface on the image side thereof, thereby effectively correcting not only chromatic aberration but also other aberrations.

The focal length of the final lens is f'=−282 millimeters. That is, the final lens has a relatively weak power.

Figures 2A, 2B, 2C, 2D:
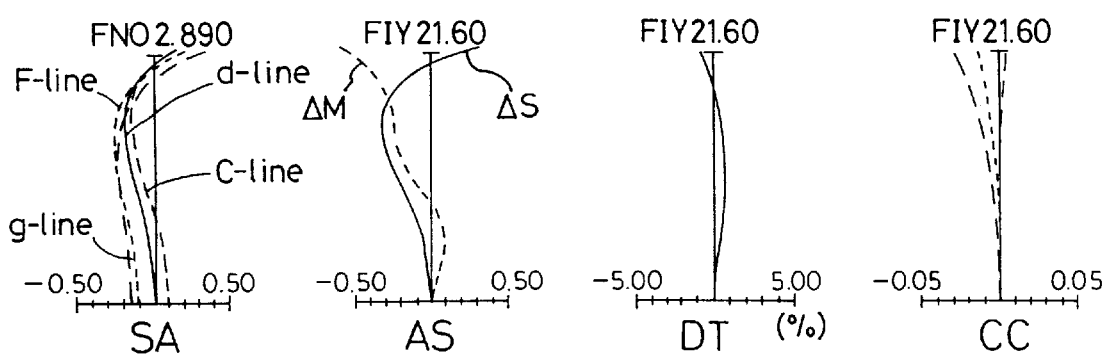
FIG. 2 is a diagram showing aberrations in Example 1.

FIG. 2 is a diagram showing aberrations in this example. In the aberrational diagram: SA denotes spherical aberration; AS denotes astigmatism; DT denotes distortion; and CC denotes lateral chromatic aberration. FIY denotes image height. The same shall apply in the following aberrational diagrams.

EXAMPLE 2

Figure 3A:
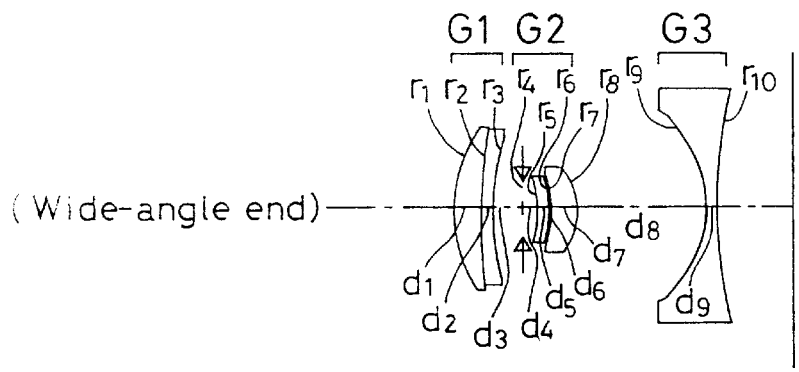
FIG. 3 is a sectional view of a photographic optical system according to Example 2 of the present invention.
Figure 3B:
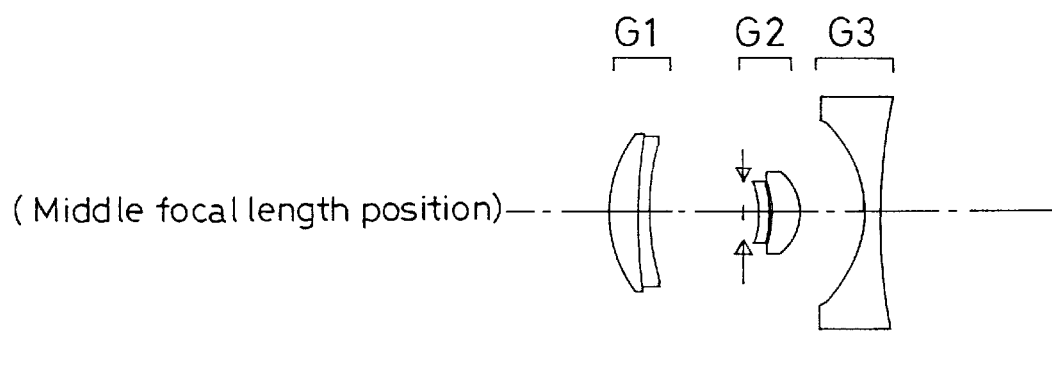
Figure 3C:
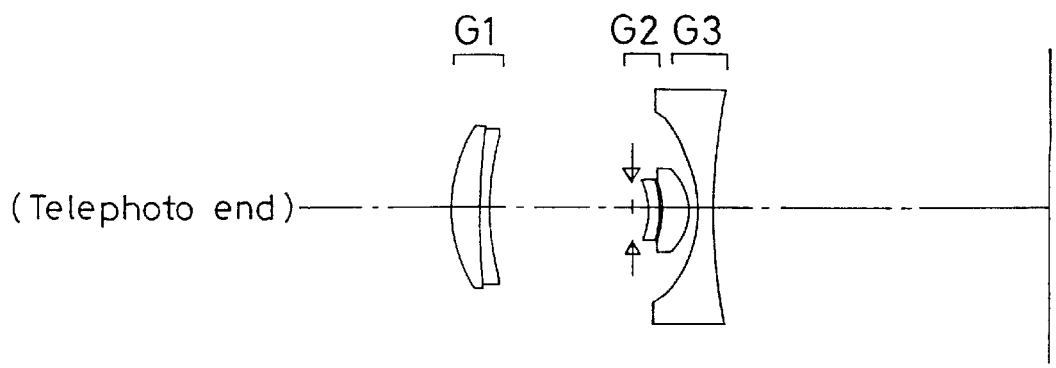
Figure 4A:
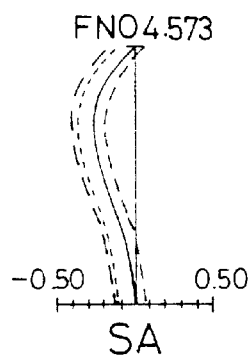
FIG. 4 is a diagram showing aberrations in Example 2.
Figure 4B:
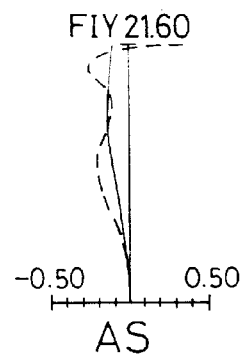
Figure 4C:
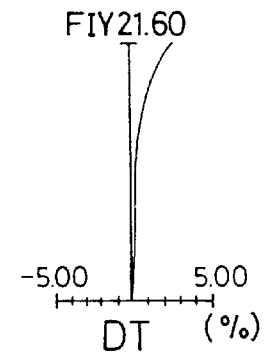
Figure 4D:
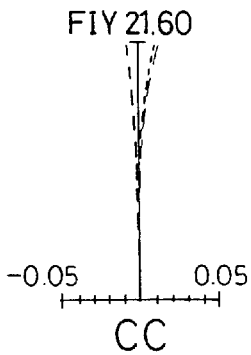
Figure 4E:
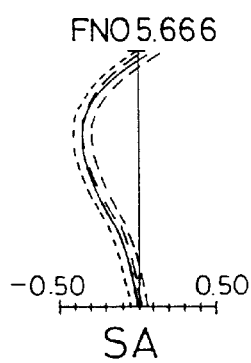
Figure 4F:
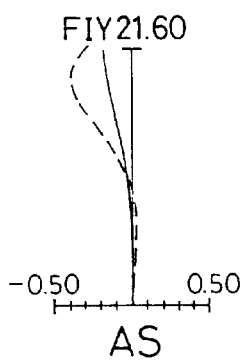
Figure 4G:
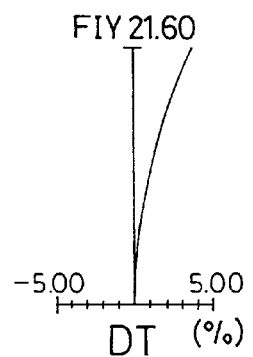
Figure 4H:
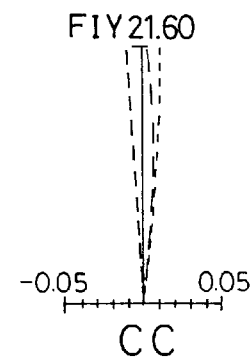
Figure 4I:
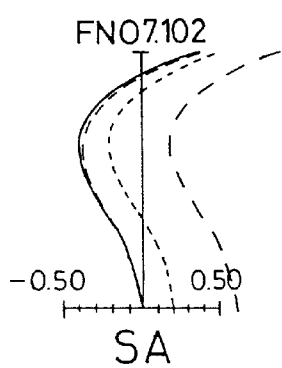
Figure 4J:
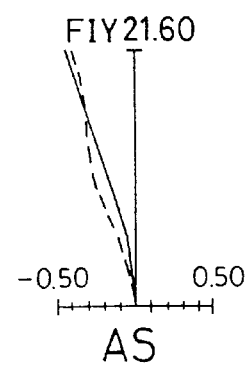
Figure 4K:
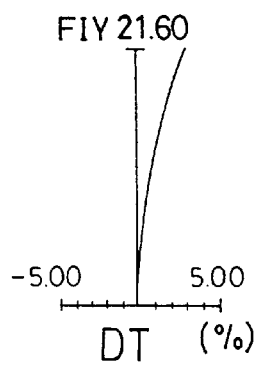
Figure 4L:
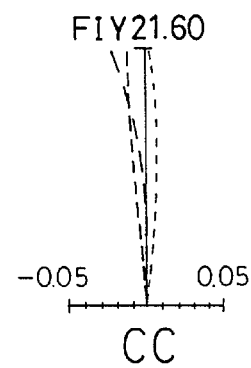

This example is a three-unit zoom lens system having a focal length of from 39.1 to 87.3 millimeters. FIG. 3 is a sectional view showing the zoom lens system at a wide-angle end, a middle focal length position, and a telephoto end. As shown in the figure, the zoom lens system has, in order from the object side thereof, a positive first unit G1, a positive second unit G2, and a third unit G3. The first unit G1 is formed from a cemented lens consisting essentially of a positive meniscus lens element that is convex toward the object side and a negative meniscus lens element. The second unit G2 has an aperture stop and two lenses, i.e. a negative meniscus lens that is concave toward the object side, and a positive meniscus lens. The third unit G3 consists essentially of a single biconcave negative lens. Aspherical surfaces are used for both surfaces of the positive lens in the second unit G2, and an aspherical surface is also used for an object-side surface of the negative lens that forms the third unit G3. Zooming from the wide-angle end toward the telephoto end is performed by moving each lens unit toward the object side.

An optical plastic "CYTOP" is used for the positive lens in the second unit G2 and for the negative lens of the third unit G3, thereby favorably correcting axial and lateral chromatic aberrations with good balance. The use of aspherical lenses as these lenses is also effective for correction of other aberrations. Because the positive lens and the negative lens are plastic lenses, it is possible to cancel a focal shift and other changes due to temperature and humidity changes at the two lenses.

Furthermore, in such an optical system (having positive, positive and negative lens units), focusing on a close-distance object point is often effected by moving the second unit G2. Accordingly, the provision of a plastic lens in the second unit G2 allows the optical system to be light in weight and hence makes it possible to reduce the load on the mechanical drive system for movement during focusing. Similarly, in such an optical system (having positive, positive and negative lens units), the negative third unit G3 often has the largest configuration. Accordingly, the use of a plastic lens for the negative lens of the third unit G3 makes it possible to attain a reduction in the weight of the optical system.

FIG. 4 is a diagram showing aberrations in this example. Part (a) of FIG. 4 shows aberrations at the wide-angle end. Part (b) of FIG. 4 shows aberrations at the middle focal length position. Part (c) of FIG. 4 shows aberrations at the telephoto end. The same shall apply hereinafter.

EXAMPLE 3

Figure 5A:
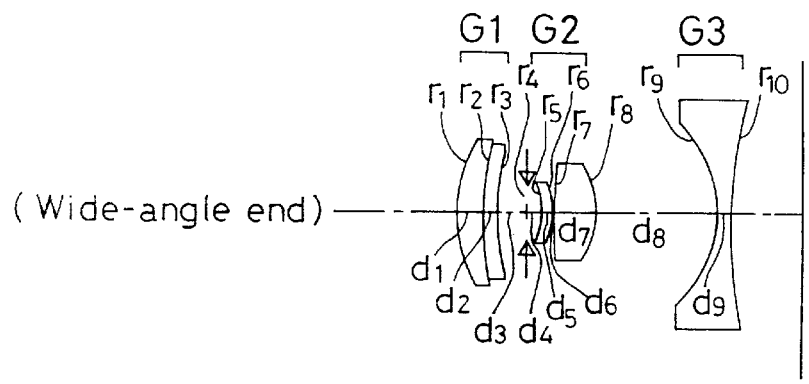
FIG. 5 is a sectional view of a photographic optical system according to Example 3 of the present invention.
Figure 5B:
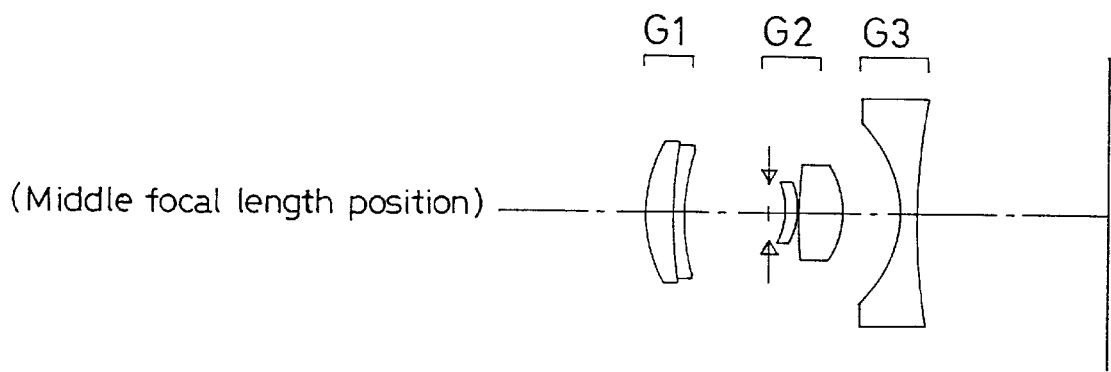
Figure 5C:
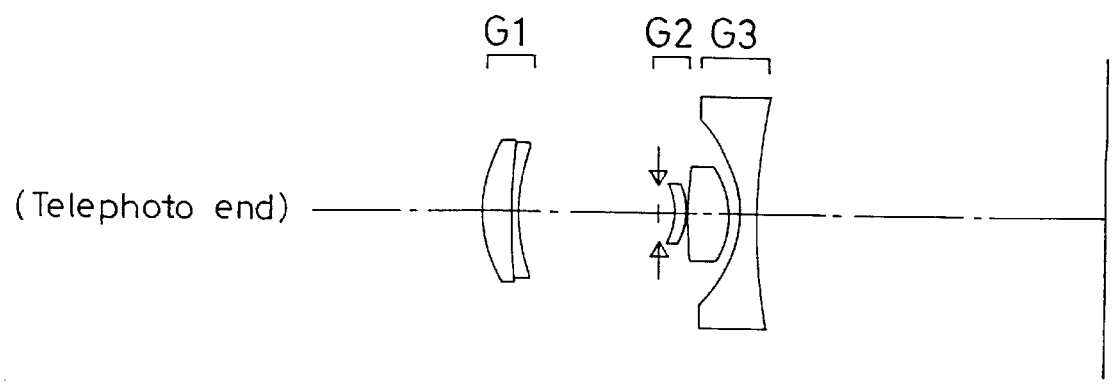
Figure 6A:
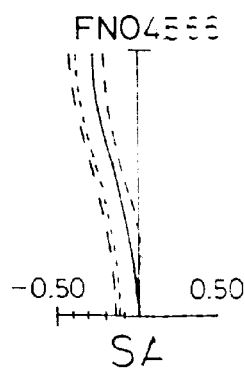
FIG. 6 is a diagram showing aberrations in Example 3.
Figure 6B:
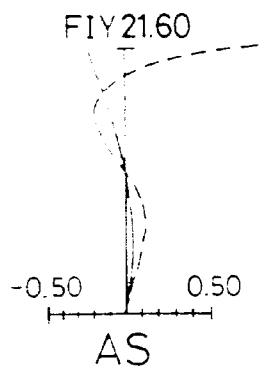
Figure 6C:
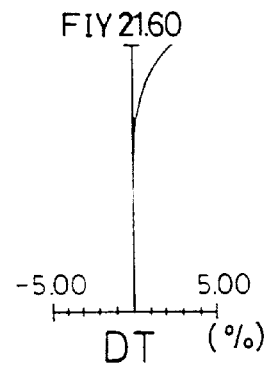
Figure 6D:
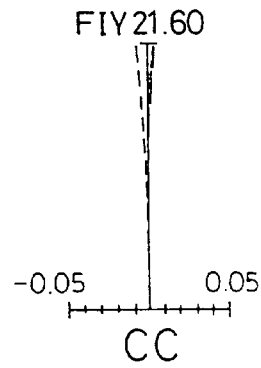
Figure 6E:
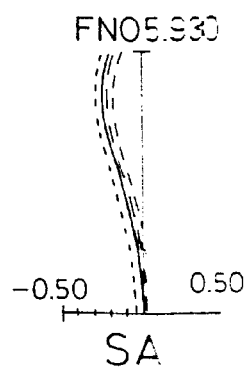
Figure 6F:
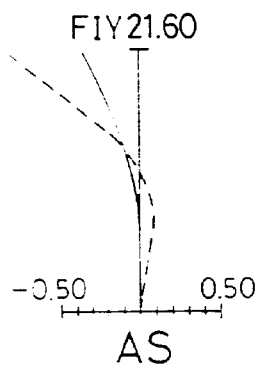
Figure 6G:
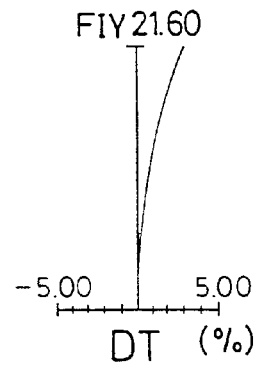
Figure 6H:
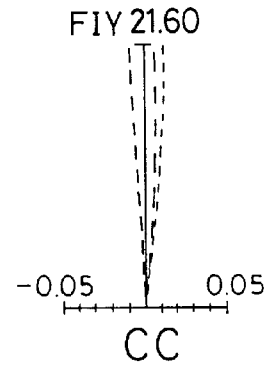
Figure 6I:
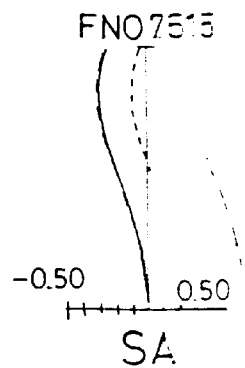
Figure 6J:
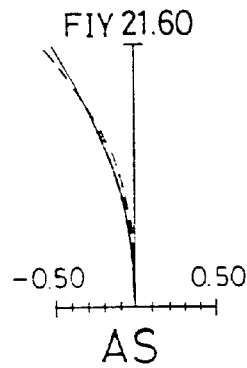
Figure 6K:
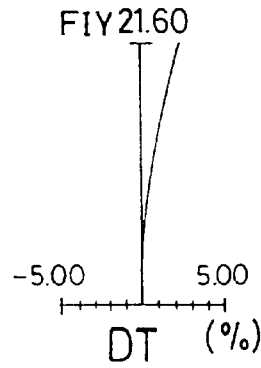
Figure 6L:
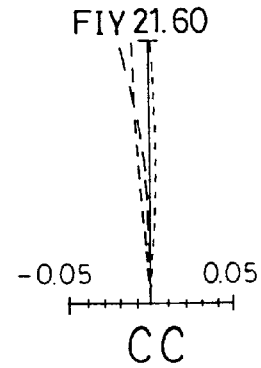

This example is a three-unit zoom lens system having a focal length of from 39.1 to 87.1 millimeters. FIG. 5 is a sectional view showing the zoom lens system at a wide-angle end, a middle focal length position, and a telephoto end. As shown in the figure, the zoom lens system has, in order from the object side thereof, a positive first unit G1, a positive second unit G2, and a third unit G3. The first unit G1 is formed from a cemented lens consisting essentially of a positive meniscus lens element that is convex toward the object side and a negative meniscus lens element. The second unit G2 has an aperture stop and two lenses, i.e. a negative meniscus lens that is concave toward the object side, and a biconvex positive lens. The third unit G3 consists essentially of a single biconcave negative lens. An aspherical surface is used for an image-side surface of the positive lens in the second unit G2, and another aspherical surface is used for an object-side surface of the negative lens that forms the third unit G3. Zooming from the wide-angle end toward the telephoto end is performed by moving each lens unit toward the object side. The rest of this example has the same arrangement and function as in the above-described Example 2. In Example 2, "CYTOP" is used for the positive meniscus lens having a convex surface directed toward the image side in the second unit G2, whereas in this example, "CYTOP" is used for the biconvex lens in the second unit G2. FIG. 6 is an aberrational diagram similar to FIG. 4, showing aberrations in this example.

EXAMPLE 4

Figure 7A:
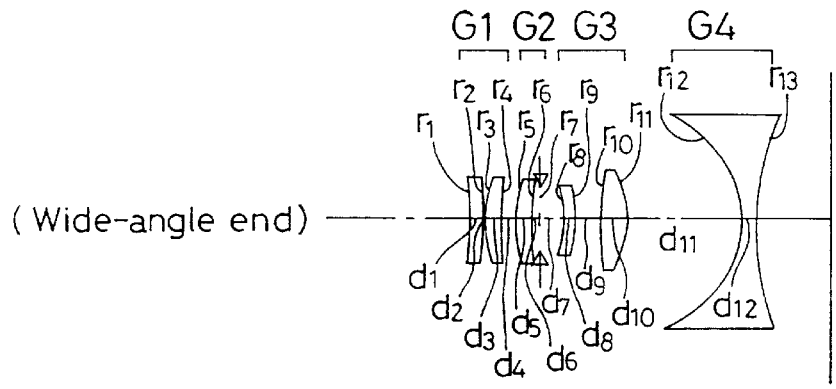
FIG. 7 is a sectional view of a photographic optical system according to Example 4 of the present invention.
Figure 7B:
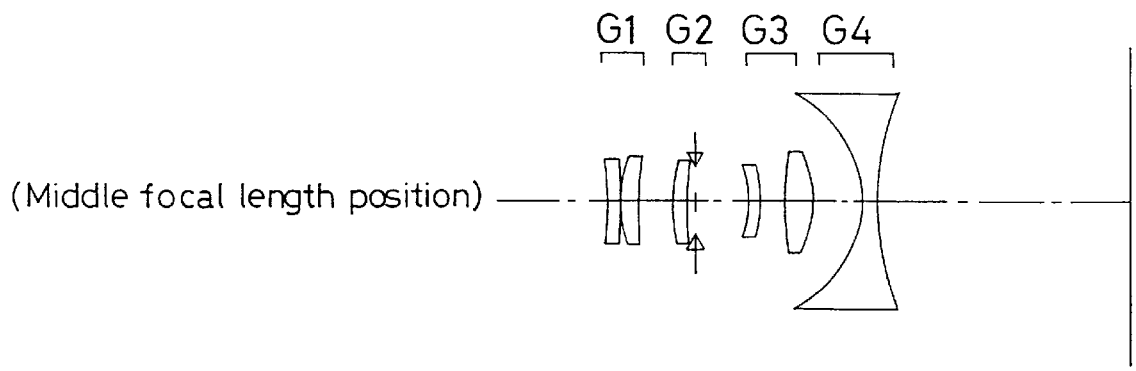
Figure 7C:
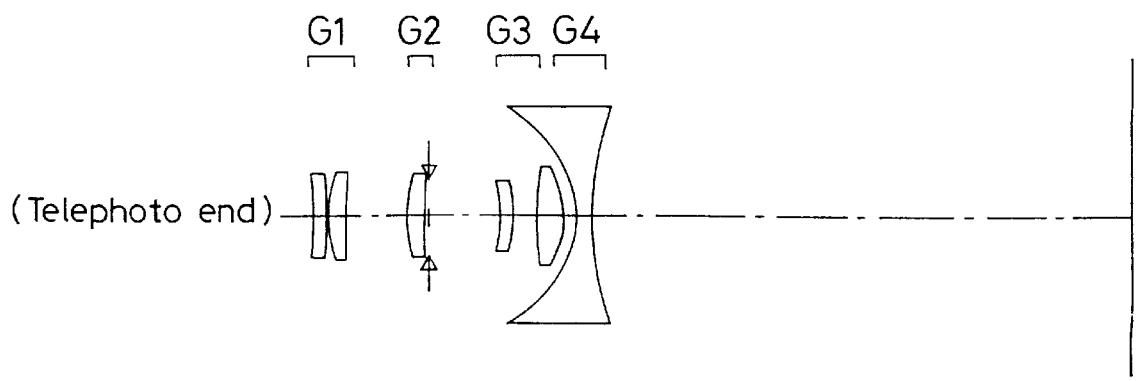
Figure 8A:
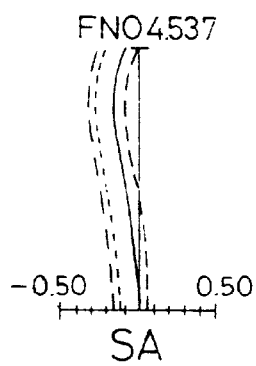
FIG. 8 is a diagram showing aberrations in Example 4.
Figure 8B:
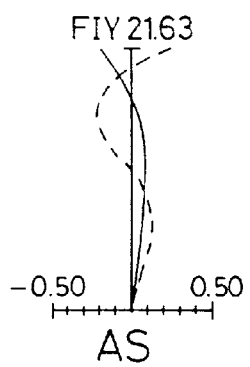
Figure 8C:
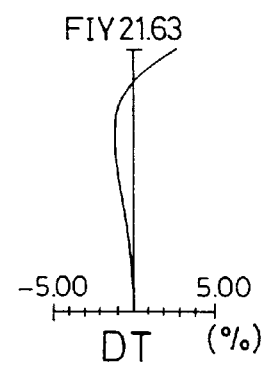
Figure 8D:
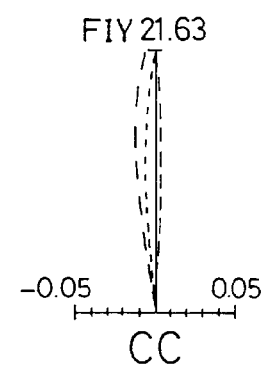
Figure 8E:
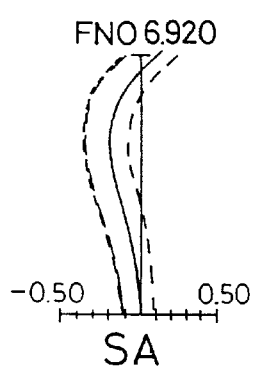
Figure 8F:
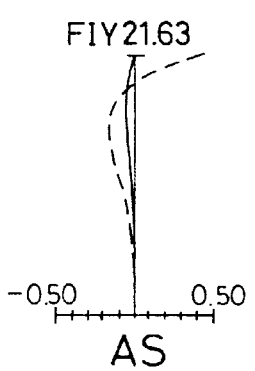
Figure 8G:
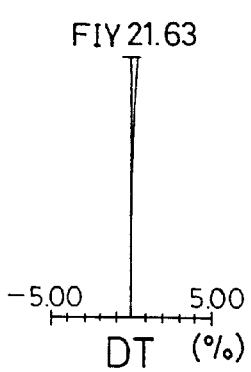
Figure 8H:
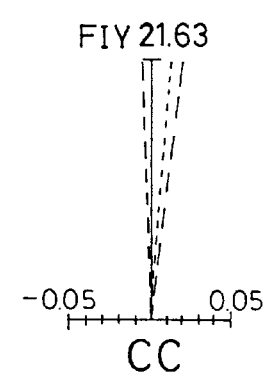
Figure 8I:
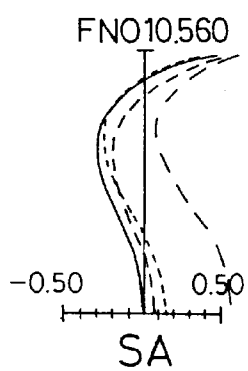
Figure 8J:
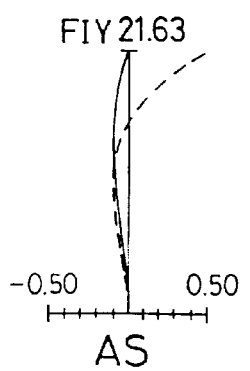
Figure 8K:
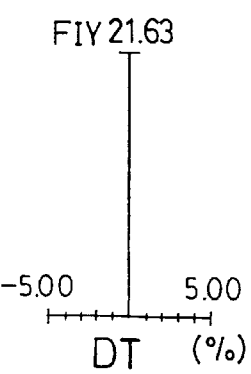
Figure 8L:
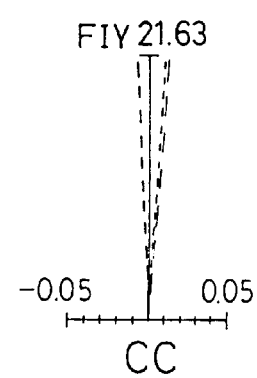

This example is a four-unit zoom lens system having a focal length of from 39.1 to 116.4 millimeters. FIG. 7 is a sectional view showing the zoom lens system at a wide-angle end, a middle focal length position, and a telephoto end. As shown in the figure, the zoom lens system has, in order from the object side thereof, a powerless first unit G1, a positive second unit G2, a positive third unit G3, and a fourth lens G4. The first unit G1 has two lenses, i.e. a negative meniscus lens having a concave surface directed toward the object side, and a positive meniscus lens having a convex surface directed toward the object side. The second unit G2 has a positive meniscus lens having a convex surface directed toward the object side, and an aperture stop. The third unit G3 has two lenses, i.e. a negative meniscus lens having a concave surface directed toward the object side, and a biconvex positive lens. The fourth unit G4 consists essentially of a single biconcave negative lens. An aspherical surface is used for an image-side surface of the positive lens in the third unit G3, and another aspherical surface is used for an object-side surface of the negative lens that forms the fourth unit G4. Zooming from the wide-angle end toward the telephoto end is performed by moving each lens unit toward the object side.

An optical plastic "CYTOP" is used for the positive lens in the third unit G3 and for the negative lens of the fourth unit G4, thereby favorably correcting axial and lateral chromatic aberrations. The use of aspherical lenses as these lenses is also effective for correction of other aberrations. Because the positive lens and the negative lens are plastic lenses, it is possible to cancel a focal shift and other changes due to temperature and humidity changes at the two lenses.

Furthermore, in such an optical system (having powerless, positive, positive and negative lens units), focusing on a close-distance object point is often effected by moving the third unit G3. Accordingly, the provision of a plastic lens in the third unit G3 allows the optical system to be light in weight and hence makes it possible to reduce the load on the mechanical drive system for movement during focusing. Similarly, in such an optical system (having powerless, positive, positive and negative lens units), the negative fourth unit G4 often has the largest configuration. Accordingly, the use of a plastic lens for the negative lens of the fourth unit G4 makes it possible to attain a reduction in the weight of the optical system. FIG. 8 is an aberrational diagram similar to FIG. 4, showing aberrations in this example.

EXAMPLE 5

This example is a zoom lens system arranged and operating as in the case of the above-described Example 4. Therefore, an illustration of this example is omitted. The zoom lens system according to this example has a focal length of from 39.1 to 131.0 millimeters. Thus, the focal length at the telephoto end is increased in comparison to Example 4. In this example, the use of "CYTOP" makes it possible to attain an improvement in chromatic aberration (particularly axial chromatic aberration) at the telephoto end, and this enables the focal length at the telephoto end to increase. Examples 4 and 5 have similar arrangements. However, in Example 4, an improvement in performance is attained effectively by a marked improvement in chromatic aberration. In Example 5, the improvement in performance is appropriated for an increase in the focal length at the telephoto end. The level of chromatic aberration in Example 5 is still better than the level in the prior art. Therefore, it is possible to further increase the focal length at the telephoto end.

EXAMPLE 6

This example is a zoom lens system arranged as in the case of the above-described Example 2. Therefore, an illustration of this example is omitted. It should, however, be noted that an ED glass lens is used for the positive lens in the positive second unit G2, and another ED glass lens is used for the negative lens in the negative third unit G3. The use of glass lenses eliminates the likelihood of performance deterioration due to changes in temperature and humidity. It should be noted that an aspherical surface is used for an image-side surface of the positive lens in the second unit G2, and another aspherical surface is used for an object-side surface of the negative lens in the third unit G3.

The chromatic aberration improving effect in this example is the same as in Examples 2 and 3. The use of aspherical lenses is also effective for correction of other aberrations. ED lenses are soft and readily scratchable and hence difficult to process. Therefore, the use of ED lenses causes the cost to rise. However, the use of molded lenses dispenses with a polishing process and thus enables a reduction in the cost.

EXAMPLE 7

This example is a zoom lens system arranged and operating as in the case of the above-described Example 6. Therefore, an illustration of this example is omitted.

EXAMPLE 8

This example is a zoom lens system arranged as in the case of the above-described Example 4. Therefore, an illustration of this example is omitted. It should, however, be noted that an ED glass lens is used for the positive lens in the positive third unit G3, and another ED glass lens is used for the negative lens in the negative fourth unit G4. The use of glass lenses eliminates the likelihood of performance deterioration due to changes in temperature and humidity.

The chromatic aberration improving effect in this example is the same as in Example 4. The use of aspherical lenses is also effective for correction of other aberrations. ED lenses are soft and readily scratchable and hence difficult to process. Therefore, the use of ED lenses causes the cost to rise. However, the use of molded lenses dispenses with a polishing process and thus enables a reduction in the cost.

EXAMPLE 9

This example is a zoom lens system arranged and operating as in the case of the above-described Example 8. Therefore, an illustration of this example is omitted.

Lens data in the above-described Examples 1 to 9 will be shown below. In the following: reference character f denotes the focal length of the entire system; $F_{NO}$ is F-number; $f_B$ is the back focus; $r_1$, $r_2$ ... are the radii of curvature of lens surfaces; $d_1$, $d_2$ ... are the spacings between adjacent lens surfaces; $n_{d1}$, $n_{d2}$ ... are the refractive indices of the lenses for the spectral d-line; and $v_{d1}$, $v_{d2}$ ... are the Abbe's numbers of the lenses for the spectral d-line. Assuming that x is taken in the direction of the optical axis, where the direction of travel of light is defined as a positive direction, and y is taken in a direction perpendicular to the optical axis, an aspherical configuration is expressed by $$x=(y^2/r)/[1+\{1-(K+1)(y/r)^2\}^{1/2}]+A_4 y^4+A_6 y^6+A_8 y^8+A_{10} y^{10}$$

where r is a paraxial curvature radius; K is a conical coefficient; and $A_4$, $A_6$, $A_8$ and $A_{10}$ are 4th-, 6th-, 8th- and 10th-order aspherical coefficients, respectively.

EXAMPLE 1 f = 33.894
$F_{NO}$ = 2.890
$f_B$ = 16.500

| | | | | | | | |
|---|---|---|---|---|---|---|---|
| $r_1$ = | 11.8994 | $d_1$ = | 2.7000 | $n_{d1}$ = | 1.79952 | $v_{d1}$ = | 42.22 |
| $r_2$ = | 53.1702 | $d_2$ = | 0.9200 | | | | |
| $r_3$ = | −53.2307 | $d_3$ = | 1.0000 | $n_{d2}$ = | 1.72825 | $v_{d2}$ = | 28.46 |
| $r_4$ = | 12.1038 | $d_4$ = | 1.6000 | | | | |
| $r_5$ = | ∞ (Stop) | $d_5$ = | 0.8900 | | | | |
| $r_6$ = | 97.8497 | $d_6$ = | 2.3000 | $n_{d3}$ = | 1.78590 | $v_{d3}$ = | 44.19 |
| $r_7$ = | −20.0503 | $d_7$ = | 10.6266 | | | | |
| $r_8$ = | −9.7888 | $d_8$ = | 1.4000 | $n_{d4}$ = | 1.34000 | $v_{d4}$ = | 90.00 |
| $r_9$ = | −11.2974 | | | | | | |
| (Aspheric) | | | | | | | |

Aspherical Coefficients

9th surface

K = 0
$A_4$ = 5.9332 × 10⁻⁵
$A_6$ = −1.0847 × 10⁻⁶
$A_8$ = 1.4931 × 10⁻⁸
$A_{10}$ = −7.8384 × 10⁻¹¹

EXAMPLE 2 f = 39.140~58.450~87.301
$F_{NO}$ = 4.635~5.750~7.211
$f_B$ = 8.833~23.430~44.253

| | | | | | | | |
|---|---|---|---|---|---|---|---|
| $r_1$ = | 19.3675 | $d_1$ = | 3.5000 | $n_{d1}$ = | 1.72916 | $v_{d1}$ = | 54.68 |
| $r_2$ = | 73.3237 | $d_2$ = | 1.5000 | $n_{d2}$ = | 1.84666 | $v_{d2}$ = | 23.78 |
| $r_3$ = | 32.3602 | $d_3$ = | (Variable) | | | | |
| $r_4$ = | ∞ (Stop) | $d_4$ = | 2.0000 | | | | |
| $r_5$ = | −11.2363 | $d_5$ = | 1.5000 | $n_{d3}$ = | 1.58144 | $v_{d3}$ = | 40.75 |
| $r_6$ = | −14.0144 | $d_6$ = | 0.3000 | | | | |
| $r_7$ = | −22.6853 | $d_7$ = | 3.8000 | $n_{d4}$ = | 1.34000 | $v_{d4}$ = | 90.00 |
| (Aspheric) | | | | | | | |
| $r_8$ = | −7.6659 | $d_8$ = | (Variable) | | | | |
| (Aspheric) | | | | | | | |
| $r_9$ = | −13.3235 | $d_9$ = | 1.8000 | $n_{d5}$ = | 1.34000 | $v_{d5}$ = | 90.00 |
| (Aspheric) | | | | | | | |
| $r_{10}$ = | 84.8594 | | | | | | |

Zooming Spaces

| f | 39.140 | 58.450 | 87.301 |
|---|---|---|---|
| $d_3$ | 4.000 | 12.717 | 19.382 |
| $d_8$ | 17.150 | 8.420 | 1.200 |

Aspherical Coefficients

7th surface

K = 0
$A_4$ = −4.3537 × 10⁻⁴
$A_6$ = −7.1921 × 10⁻⁶
$A_8$ = −3.9969 × 10⁻⁷
$A_{10}$ = 0

8th surface

K = 0.6339
$A_4$ = 8.6200 × 10⁻⁵
$A_6$ = 6.0057 × 10⁻⁶
$A_8$ = −3.1004 × 10⁻⁷
$A_{10}$ = 8.5830 × 10⁻⁹

9th surface

K = 0.0903
$A_4$ = 5.9736 × 10⁻⁵
$A_6$ = 1.2568 × 10⁻⁶
$A_8$ = −1.1661 × 10⁻⁸
$A_{10}$ = 5.3122 × 10⁻¹¹

EXAMPLE 3

| | | | | | | | |
|---|---|---|---|---|---|---|---|
| | | $f = 39.124 \sim 58.371 \sim 87.052$ | | | | | |
| | | $F_{NO} = 4.635 \sim 6.029 \sim 7.649$ | | | | | |
| | | $f_B = 9.193 \sim 24.804 \sim 45.376$ | | | | | |
| $r_1 =$ | 19.4762 | $d_1 =$ | 3.5000 | $n_{d1} =$ | 1.72916 | $\nu_{d1} =$ | 54.68 |
| $r_2 =$ | 59.0578 | $d_2 =$ | 1.5000 | $n_{d2} =$ | 1.84666 | $\nu_{d2} =$ | 23.78 |
| $r_3 =$ | 30.0375 | $d_3 =$ | (Variable) | | | | |
| $r_4 =$ | ∞ (Stop) | $d_4 =$ | 2.0000 | | | | |
| $r_5 =$ | −9.5193 | $d_5 =$ | 1.5000 | $n_{d3} =$ | 1.58144 | $\nu_{d3} =$ | 40.75 |
| $r_6 =$ | −11.7749 | $d_6 =$ | 0.1500 | | | | |
| $r_7 =$ | 102.6186 | $d_7 =$ | 5.9290 | $n_{d4} =$ | 1.34000 | $\nu_{d4} =$ | 90.00 |
| $r_8 =$ | −11.0977 (Aspheric) | $d_8 =$ | (Variable) | | | | |
| $r_9 =$ | −13.2692 (Aspheric) | $d_9 =$ | 1.8000 | $n_{d5} =$ | 1.34000 | $\nu_{d5} =$ | 90.00 |
| $r_{10} =$ | 71.9123 | | | | | | |

Zooming Spaces

| | | | |
|---|---|---|---|
| f | 39.124 | 58.371 | 87.052 |
| $d_3$ | 4.000 | 11.425 | 18.798 |
| $d_8$ | 15.737 | 7.673 | 1.200 |

Aspherical Coefficients

8th surface $K =$ 0.3343
$A_4 =$ $1.3498 \times 10^{-4}$
$A_6 =$ $1.2941 \times 10^{-6}$
$A_8 =$ $-1.5128 \times 10^{-8}$
$A_{10} =$ $3.0562 \times 10^{-10}$ 9th surface $K =$ −0.0037
$A_4 =$ $7.5834 \times 10^{-5}$
$A_6 =$ $6.6211 \times 10^{-7}$
$A_8 =$ $-4.4988 \times 10^{-9}$
$A_{10} =$ $1.8402 \times 10^{-11}$

EXAMPLE 4

| | | | | | | | |
|---|---|---|---|---|---|---|---|
| | | $f = 39.140 \sim 67.499 \sim 116.403$ | | | | | |
| | | $F_{NO} = 4.635 \sim 7.080 \sim 10.815$ | | | | | |
| | | $f_B = 9.655 \sim 32.507 \sim 71.009$ | | | | | |
| $r_1 =$ | −45.4813 | $d_1 =$ | 1.8000 | $n_{d1} =$ | 1.78472 | $\nu_{d1} =$ | 25.68 |
| $r_2 =$ | −311.6050 | $d_2 =$ | 0.1500 | | | | |
| $r_3 =$ | 19.9682 | $d_3 =$ | 2.3000 | $n_{d2} =$ | 1.51823 | $\nu_{d2} =$ | 58.90 |
| $r_4 =$ | 48.2005 | $d_4 =$ | (Variable) | | | | |
| $r_5 =$ | 23.3727 | $d_5 =$ | 2.1000 | $n_{d3} =$ | 1.67270 | $\nu_{d3} =$ | 32.10 |
| $r_6 =$ | 60.2275 | $d_6 =$ | 0.9000 | | | | |
| $r_7 =$ | ∞ (Stop) | $d_7 =$ | (Variable) | | | | |
| $r_8 =$ | 14.4619 | $d_8 =$ | 1.6000 | $n_{d4} =$ | 1.78472 | $\nu_{d4} =$ | 25.68 |
| $r_9 =$ | −19.7930 | $d_9 =$ | 3.0339 | | | | |
| $r_{10} =$ | 34.3508 | $d_{11} =$ | 3.8000 | $n_{d5} =$ | 1.34000 | $\nu_{d5} =$ | 90.00 |
| $r_{11} =$ | −13.9150 (Aspheric) | $d_{12} =$ | (Variable) | | | | |
| $r_{12} =$ | −10.9613 (Aspheric) | $d_{13} =$ | 1.9000 | $n_{d6} =$ | 1.34000 | $\nu_{d6} =$ | 90.00 |
| $r_{13} =$ | 41.8056 | | | | | | |

Zooming Spaces

| | | | |
|---|---|---|---|
| f | 39.140 | 67.499 | 116.403 |
| $d_4$ | 2.000 | 4.318 | 8.545 |
| $d_7$ | 3.452 | 7.369 | 10.102 |
| $d_{11}$ | 15.173 | 7.159 | 2.000 |

Aspherical Coefficients

11th surface $K =$ 0.5394
$A_4 =$ $3.5362 \times 10^{-5}$
$A_6 =$ $3.0893 \times 10^{-7}$
$A_8 =$ $-3.7467 \times 10^{-9}$
$A_{10} =$ $5.4568 \times 10^{-12}$ 12th surface $K =$ −1.1910
$A_4 =$ $3.5362 \times 10^{-5}$
$A_6 =$ $3.0893 \times 10^{-7}$
$A_8 =$ $-3.7467 \times 10^{-9}$
$A_{10} =$ $5.4568 \times 10^{-12}$

EXAMPLE 5

| | | | | | | | |
|---|---|---|---|---|---|---|---|
| | | $f = 39.141 \sim 71.614 \sim 131.022$ | | | | | |
| | | $F_{NO} = 4.635 \sim 7.250 \sim 11.330$ | | | | | |
| | | $f_B = 9.037 \sim 35.204 \sim 81.831$ | | | | | |
| $r_1 =$ | −36.4010 | $d_1 =$ | 1.8000 | $n_{d1} =$ | 1.78472 | $\nu_{d1} =$ | 25.68 |
| $r_2 =$ | −77.7501 | $d_2 =$ | 0.1500 | | | | |
| $r_3 =$ | 18.3580 | $d_3 =$ | 2.3000 | $n_{d2} =$ | 1.51823 | $\nu_{d2} =$ | 58.90 |
| $r_4 =$ | 39.2561 | $d_4 =$ | (Variable) | | | | |
| $r_5 =$ | 31.7158 | $d_5 =$ | 2.1000 | $n_{d3} =$ | 1.67270 | $\nu_{d3} =$ | 32.10 |
| $r_6 =$ | 86.2527 | $d_6 =$ | 0.9000 | | | | |
| $r_7 =$ | ∞ (Stop) | $d_7 =$ | (Variable) | | | | |
| $r_8 =$ | −14.4644 | $d_8 =$ | 1.6000 | $n_{d4} =$ | 1.78472 | $\nu_{d4} =$ | 25.68 |
| $r_9 =$ | −19.0687 | $d_9 =$ | 3.2501 | | | | |
| $r_{10} =$ | 32.4916 | $d_{10} =$ | 3.8000 | $n_{d5} =$ | 1.34000 | $\nu_{d5} =$ | 90.00 |
| $r_{11} =$ | −15.0021 (Aspheric) | $d_{11} =$ | (Variable) | | | | |
| $r_{12} =$ | −11.3878 (Aspheric) | $d_{12} =$ | 4.9000 | $n_{d6} =$ | 1.34000 | $\nu_{d6} =$ | 90.00 |
| $r_{13} =$ | 41.6406 | | | | | | |

Zooming Spaces

| | | | |
|---|---|---|---|
| f | 39.141 | 71.614 | 131.022 |
| $d_4$ | 2.000 | 5.448 | 10.535 |
| $d_7$ | 3.783 | 7.322 | 9.099 |
| $d_{11}$ | 15.657 | 6.772 | 1.500 |

Aspherical Coefficients

11th surface $K =$ 0.5477
$A_4 =$ $1.1260 \times 10^{-4}$
$A_6 =$ $5.7306 \times 10^{-7}$
$A_8 =$ $-7.3064 \times 10^{-9}$
$A_{10} =$ $9.2616 \times 10^{-11}$ 12th surface $K =$ −1.1911
$A_4 =$ $3.8644 \times 10^{-5}$
$A_6 =$ $2.0444 \times 10^{-7}$
$A_8 =$ $-2.9220 \times 10^{-9}$
$A_{10} =$ $4.5848 \times 10^{-12}$

EXAMPLE 6

$f = 39.124 \sim 58.420 \sim 87.234$
$F_{NO} = 4.635 \sim 5.901 \sim 7.553$
$F_B = 8.987 \sim 23.463 \sim 43.907$

| | | | | | | | |
|---|---|---|---|---|---|---|---|
| $r_1 =$ | 19.8064 | $d_1 =$ | 3.2000 | $n_{d1} =$ | 1.72916 | $v_{d1} =$ | 54.68 |
| $r_2 =$ | 74.5403 | $d_2 =$ | 1.7000 | $n_{d2} =$ | 1.84666 | $v_{d2} =$ | 23.78 |
| $r_3 =$ | 33.0858 | $d_3 =$ | (Variable) | | | | |
| $r_4 =$ | ∞ (Stop) | $d_4 =$ | 4.5975 | | | | |
| $r_5 =$ | −7.2916 | $d_5 =$ | 1.2486 | $n_{d3} =$ | 1.58144 | $v_{d3} =$ | 40.75 |
| $r_6 =$ | −8.4523 | $d_6 =$ | 0.1249 | | | | |
| $r_7 =$ | −78.6267 | $d_7 =$ | 4.6873 | $n_{d4} =$ | 1.43875 | $v_{d4} =$ | 94.99 |
| $r_8 =$ | −12.2356 (Aspheric) | $d_8 =$ | (Variable) | | | | |
| $r_9 =$ | −16.8756 (Aspheric) | $d_9 =$ | 1.8000 | $n_{d5} =$ | 1.49700 | $v_{d5} =$ | 81.54 |
| $r_{10} =$ | 379.8252 | | | | | | |

Zooming Spaces

| f | 39.124 | 58.420 | 87.234 |
|---|---|---|---|
| $d_3$ | 2.872 | 11.173 | 17.729 |
| $d_8$ | 16.151 | 7.942 | 1.200 |

Aspherical Coefficients

8th surface $K = 0.2791$
$A_4 = 6.7129 \times 10^{-5}$
$A_6 = 1.0930 \times 10^{-6}$
$A_8 = -1.2672 \times 10^{-8}$
$A_{10} = 1.6877 \times 10^{-10}$ 9th surface $K = 0.4982$
$A_4 = 3.9791 \times 10^{-5}$
$A_6 = 6.2207 \times 10^{-7}$
$A_8 = -4.6373 \times 10^{-9}$
$A_{10} = 1.8910 \times 10^{-11}$

EXAMPLE 7

$f = 39.141 \sim 58.447 \sim 87.291$
$F_{NO} = 4.644 \sim 5.926 \sim 7.630$
$f_B = 9.214 \sim 24.159 \sim 45.286$

| | | | | | | | |
|---|---|---|---|---|---|---|---|
| $r_1 =$ | 19.7631 | $d_1 =$ | 3.2000 | $n_{d1} =$ | 1.72916 | $v_{d1} =$ | 54.68 |
| $r_2 =$ | 66.7106 | $d_2 =$ | 1.7000 | $n_{d2} =$ | 1.84666 | $v_{d2} =$ | 23.78 |
| $r_3 =$ | 31.7869 | $d_3 =$ | (Variable) | | | | |
| $r_4 =$ | ∞ (Stop) | $d_4 =$ | 4.6152 | | | | |
| $r_5 =$ | −7.4599 | $d_5 =$ | 1.2486 | $n_{d3} =$ | 1.58144 | $v_{d3} =$ | 40.75 |
| $r_6 =$ | −8.7908 | $d_6 =$ | 0.1249 | | | | |
| $r_7 =$ | −91.5532 | $d_7 =$ | 4.7520 | $n_{d4} =$ | 1.43875 | $v_{d4} =$ | 94.99 |
| $r_8 =$ | −11.9919 (Aspheric) | $d_8 =$ | (Variable) | | | | |
| $r_9 =$ | −16.6576 (Aspheric) | $d_9 =$ | 1.8000 | $n_{d5} =$ | 1.45600 | $v_{d5} =$ | 90.33 |
| $r_{10} =$ | 173.8937 | | | | | | |

Zooming Spaces

| f | 39.141 | 58.447 | 87.291 |
|---|---|---|---|
| $d_3$ | 2.872 | 11.200 | 17.803 |
| $d_8$ | 16.174 | 7.924 | 1.200 |

Aspherical Coefficients

8th surface $K = 0.2798$
$A_4 = 7.0451 \times 10^{-5}$
$A_6 = 1.0425 \times 10^{-6}$
$A_8 = -1.2140 \times 10^{-8}$
$A_{10} = 1.8605 \times 10^{-10}$ 9th surface $K = 0.4987$
$A_4 = 4.2947 \times 10^{-5}$
$A_6 = 6.5596 \times 10^{-7}$
$A_8 = -5.2255 \times 10^{-9}$
$A_{10} = 2.2014 \times 10^{-11}$

EXAMPLE 8

$f = 39.140 \sim 67.494 \sim 116.391$
$F_{NO} = 4.635 \sim 7.080 \sim 10.815$
$f_B = 8.715 \sim 31.161 \sim 69.142$

| | | | | | | | |
|---|---|---|---|---|---|---|---|
| $r_1 =$ | −48.1609 | $d_1 =$ | 1.8000 | $n_{d1} =$ | 1.78472 | $v_{d1} =$ | 25.68 |
| $r_2 =$ | −1306.4491 | $d_2 =$ | 0.1500 | | | | |
| $r_3 =$ | 22.3751 | $d_3 =$ | 2.3000 | $n_{d2} =$ | 1.51823 | $v_{d2} =$ | 58.90 |
| $r_4 =$ | 75.4689 | $d_4 =$ | (Variable) | | | | |
| $r_5 =$ | 24.3055 | $d_5 =$ | 2.1000 | $n_{d3} =$ | 1.67270 | $v_{d3} =$ | 32.10 |
| $r_6 =$ | 85.6262 | $d_6 =$ | 0.9000 | | | | |
| $r_7 =$ | ∞ (Stop) | $d_7 =$ | (Variable) | | | | |
| $r_8 =$ | −17.3624 | $d_8 =$ | 1.6000 | $n_{d4} =$ | 1.78472 | $v_{d4} =$ | 25.68 |
| $r_9 =$ | −26.5734 | $d_9 =$ | 3.7951 | | | | |
| $r_{10} =$ | 60.0130 | $d_{10} =$ | 3.8000 | $n_{d5} =$ | 1.45600 | $v_{d5} =$ | 90.33 |
| $r_{11} =$ | −17.9309 (Aspheric) | $d_{11} =$ | (Variable) | | | | |
| $r_{12} =$ | −13.8050 (Aspheric) | $d_{12} =$ | 1.9000 | $n_{d6} =$ | 1.43875 | $v_{d6} =$ | 94.99 |
| $r_{13} =$ | 59.7273 | | | | | | |

Zooming Spaces

| f | 39.140 | 67.494 | 116.391 |
|---|---|---|---|
| $d_4$ | 2.000 | 5.220 | 10.031 |
| $d_7$ | 3.629 | 7.154 | 9.533 |
| $d_{11}$ | 15.875 | 7.413 | 2.000 |

Aspherical Coefficients

11th surface $K = 0.5467$
$A_4 = 7.4795 \times 10^{-5}$
$A_6 = 2.8267 \times 10^{-7}$
$A_8 = -1.3292 \times 10^{-9}$
$A_{10} = 2.0330 \times 10^{-11}$ 12th surface $K = -1.1771$
$A_4 = 2.3389 \times 10^{-5}$
$A_6 = 1.1536 \times 10^{-7}$
$A_8 = -1.0179 \times 10^{-9}$
$A_{10} = 1.0519 \times 10^{-12}$

EXAMPLE 9

$f = 39.141 \sim 67.501 \sim 116.399$
$F_{NO} = 4.626 \sim 7.063 \sim 10.784$
$f_6 = 9.655 \sim 31.684 \sim 69.271$

| | | | | | | | |
|---|---|---|---|---|---|---|---|
| $r_1 =$ | −45.8043 | $d_1 =$ | 1.8000 | $n_{d1} =$ | 1.78472 | $v_{d1} =$ | 25.68 |
| $r_2 =$ | −13020.0000 | $d_2 =$ | 0.1500 | | | | |
| $r_3 =$ | 22.6851 | $d_3 =$ | 2.3000 | $n_{d2} =$ | 1.51823 | $v_{d2} =$ | 58.90 |
| $r_4 =$ | 100.1938 | $d_4 =$ | (Variable) | | | | |
| $r_5 =$ | 25.7444 | $d_5 =$ | 2.1000 | $n_{d3} =$ | 1.67270 | $v_{d3} =$ | 32.10 |
| $r_6 =$ | 124.6226 | $d_6 =$ | 0.9000 | | | | |
| $r_7 =$ | ∞ (Stop) | $d_7 =$ | (Variable) | | | | |
| $r_8 =$ | −15.5516 | $d_8 =$ | 1.6000 | $n_{d4} =$ | 1.78472 | $v_{d4} =$ | 25.68 |

-continued

| | | | | | | |
|---|---|---|---|---|---|---|
| $r_9 =$ | −22.1916 | $d_9 =$ | 3.5304 | | | |
| $r_{10} =$ | 167.7255 | $d_{10} =$ | 3.8000 | $n_{d5} = 1.49700$ | $v_{d5} = 81.54$ | |
| $r_{11} =$ | −16.9846 (Aspheric) | $d_{11} =$ | (Variable) | | | |
| $r_{12} =$ | −14.2854 (Aspheric) | $d_{12} =$ | 1.9000 | $n_{d6} = 1.49700$ | $v_{d6} = 81.54$ | |
| $r_{13} =$ | 87.4736 | | | | | |

Zooming Spaces

| f | 39.141 | 67.501 | 116.399 |
|---|---|---|---|
| $d_4$ | 2.000 | 4.635 | 9.252 |
| $d_7$ | 2.983 | 7.110 | 9.587 |
| $d_{11}$ | 15.362 | 7.213 | 2.000 |

Aspherical Coefficients

11th surface

K = 0.5471
$A_4$ = 7.3179 × 10$^{-5}$
$A_6$ = 3.4311 × 10$^{-7}$
$A_8$ = −3.1690 × 10$^{-9}$
$A_{10}$ = 5.2761 × 10$^{-11}$

12th surface

K = −1.1762
$A_4$ = 1.7941 × 10$^{-5}$
$A_6$ = 1.1873 × 10$^{-7}$
$A_8$ = −1.2380 × 10$^{-9}$
$A_{10}$ = 2.2509 × 10$^{-12}$

Table below shows values of SG, $f_1$, $\beta_{LT}$, $\beta_{LW}$, $f_F$ and $f_R$ concerning the above-described conditions in each of Examples 1 to 9.

| | SG | $f_1$ | $\beta_{LT}$ | $\beta_{LW}$ | $f_F$ | $f_R$ |
|---|---|---|---|---|---|---|
| Example 1 | 2.03 | −282.006 | | | | |
| Example 2 | 2.03 | | 2.35 | 1.3 | −33.712 | 38.951 |
| Example 3 | 2.03 | | 2.42 | 1.32 | −32.772 | 35.921 |
| Example 4 | 2.03 | | 3.85 | 1.43 | −25.311 | 40.36 |
| Example 5 | 2.03 | | 4.18 | 1.39 | −26.064 | 40.291 |
| Example 6 | 3.6 | | 2.39 | 1.31 | −32.462 | 36.959 |
| Example 7 | 3.55 | | 2.4 | 1.31 | −33.238 | 36.23 |
| Example 8 | 3.55 | | 3.77 | 1.39 | −25.357 | 45.209 |
| Example 9 | 3.6 | | 3.86 | 1.44 | −24.556 | 44.48 |

As will be clear from the foregoing description, according to the present invention, a lens of Abbe's number of 75.0 or more is appropriately placed in a photographic optical system. By doing so, in a zoom optical system, it is possible to minimize variations in chromatic aberration in zooming from the wide-angle end toward the telephoto end and hence possible to attain an improvement in performance. The improvement in performance can be appropriated for an increase in the focal length at the telephoto end. The present invention is also applicable to a fixed focal length photographic optical system. Thus, it is possible to achieve a high-performance lens system and attain a high zoom ratio. It is also possible to obtain a low-cost and lightweight lens system.

What we claim is:

1. A photographic optical system comprising:
a negative lens placed closest to an image side of said photographic optical system; and
a positive lens, a negative lens and a positive lens, which are placed in order from an object side of said photographic optical system on an object side of said negative lens closest to the image side;
wherein said negative lens closest to the image side satisfies the following conditions:

$$75.0 \leq v_d \quad (1)$$

$$0.8 \leq SG \leq 2.2 \quad (2)$$

where $v_d$ and SG are an Abbe's number and lens specific gravity (g/cm$^3$) of said negative lens closest to the image side.

2. A photographic optical system which is a zoom optical system including a single lens of negative refracting power that is placed closest to an image side of said optical system,
wherein said single lens of negative refracting power satisfies the following conditions:

$$75.0 \leq v_d \quad (3)$$

$$0.8 \leq SG \leq 2.2 \quad (4)$$

where $v_d$ and SG are an Abbe's number and lens specific gravity (g/cm$^3$) of said single lens of negative refracting power that is closest to the image side.

3. A photographic optical system which is a zoom optical system including at least a negative lens unit placed closest to an image side of said optical system, and two positive lens units placed on an object side of said negative lens unit,
wherein said negative lens unit is formed from a single lens that satisfies the following condition:

$$75.0 \leq v_d \quad (5)$$

where $v_d$ is an Abbe's number of said single lens that forms said negative lens unit.

4. A photographic optical system including a single lens of negative refracting power that is placed closest to an image side of said optical system,
wherein said single lens satisfies the following condition:

$$n_d \leq 1.40 \quad (6)$$

where $n_d$ is a refractive index of said single lens of negative refracting power.

5. A photographic optical system according to claim 1, which satisfies the following condition:

$$n_d \leq 1.40 \quad (7)$$

where $n_d$ is a refractive index of said negative lens closest to the image side.

6. A photographic optical system according to claim 1, which satisfies the following condition:

$$3 \leq |f_1/f| \leq 10 \quad (8)$$

where f is a focal length of said photographic optical system, and $f_1$ is a focal length of said negative lens closest to the image side.

7. A photographic optical system according to claim 2, which satisfies the following condition:

$$n_d \leq 1.40 \quad (9)$$

where $n_d$ is a refractive index of said single lens of negative refracting power.

8. A photographic optical system according to claim 2 or 3, wherein said single lens of negative refracting power has a concave surface directed toward the object side.

9. A photographic optical system according to claim 2 or 3, which satisfies the following condition:

$$1.75 \leq \beta_{LT}/\beta_{LW}$$

where $\beta_{LT}$ is a lateral magnification at a telephoto end of a final negative lens unit, and $\beta_{LW}$ is a lateral magnification at a wide-angle end of the final negative lens unit.

10. A photographic optical system according to claim 2, wherein a lens unit immediately in front of said single lens of negative refracting power is formed from two lenses, i.e. a negative lens and a positive lens in order from the object side of said optical system, said positive lens satisfying the following conditions:

$$75.0 \leq \nu_P$$

$$0.8 \leq SG \leq 2.2$$

where $\nu_P$ and SG are an Abbe's number and lens specific gravity (g/cm$^3$) of said positive lens.

11. A photographic optical system according to claim 3, wherein a positive lens unit immediately in front of said negative lens unit closest to the image side is formed from two lenses, i.e. a negative lens and a positive lens in order from the object side of said optical system, said positive lens satisfying the following condition:

$$75.0 \leq \nu_P$$

where $\nu_P$ is an Abbe's number of said positive lens.

12. A photographic optical system according to claim 2 or 3, which satisfies the following condition:

$$1.0 \leq |f_F/f_R| \leq 2.0$$

where $f_R$ is a focal length of said negative lens unit closest to the image side, and $f_F$ is a focal length of a lens unit located immediately in front of said negative lens unit.

13. A photographic optical system according to claim 2 or 3, wherein each lens unit comprises not more than two lenses.

* * * * *